US012691413B2

(12) United States Patent　　　　(10) Patent No.:　US 12,691,413 B2

Woelfert et al.　　　　　　　　　　(45) Date of Patent:　　　Jul. 28, 2026

(54) PROCESS FOR DECOMPOSING NITROUS OXIDE FROM A GAS STREAM

(71) Applicant: BASF SE, Ludwigshafen am Rhein (DE)

(72) Inventors: Andreas Woelfert, Ludwigshafen am Rhein (DE); Michael Lorenz, Ludwigshafen am Rhein (DE); Gerrit Waters, Ludwigshafen am Rhein (DE); Marcus Reble, Ludwigshafen am Rhein (DE); Holger Friedrich, Ludwigshafen am Rhein (DE); Andreas Weickgenannt, Ludwigshafen am Rhein (DE); Wolfgang Gmeiner, Ludwigshafen am Rhein (DE)

(73) Assignee: BASF SE, Ludwigshafen (DE)

( * ) Notice: Subject to any disclaimer, the term of this patent is extended or adjusted under 35 U.S.C. 154(b) by 474 days.

(21) Appl. No.: 18/271,875

(22) PCT Filed: Jan. 5, 2022

(86) PCT No.: PCT/EP2022/050152

§ 371 (c)(1),
(2) Date: Jul. 12, 2023

(87) PCT Pub. No.: WO2022/152608

PCT Pub. Date: Jul. 21, 2022

(65) Prior Publication Data

US 2024/0216861 A1　　Jul. 4, 2024

(30) Foreign Application Priority Data

Jan. 13, 2021　(EP) .................................... 21151405

(51) Int. Cl.
B01D 53/00　　(2006.01)
B01D 53/34　　(2006.01)
B01D 53/86　　(2006.01)

(52) U.S. Cl.
CPC ....... B01D 53/8625 (2013.01); B01D 53/343 (2013.01); B01D 53/8696 (2013.01); *B01D 2257/402* (2013.01)

(58) Field of Classification Search
None
See application file for complete search history.

(56) References Cited

U.S. PATENT DOCUMENTS

| | | | |
|---|---|---|---|
| 6,500,398 B1 | 12/2002 | Tagawa et al. | |
| 2003/0185735 A1* | 10/2003 | Hotta ..................... | B01D 53/04 |
| | | | 423/239.1 |

(Continued)

FOREIGN PATENT DOCUMENTS

| | | |
|---|---|---|
| CN | 104220147 A | 12/2014 |
| CN | 206064160 U | 4/2017 |

(Continued)

OTHER PUBLICATIONS

International Search Report and Written Opinion received for PCT Patent Application No. PCT/EP2022/050152, mailed on Mar. 11, 2022, 10 pages.

*Primary Examiner* — Stefanie J Cohen
(74) *Attorney, Agent, or Firm* — Faegre Drinker Biddle & Reath LLP

(57) ABSTRACT

The invention relates to a process for decomposing nitrous oxide from a gas stream (1), comprising: (a) heating the gas stream (1) and splitting the gas stream (1) into at least two partial streams (3, 5) or splitting the gas stream (1) into at least two partial streams (3, 5) and heating the partial streams (3, 5); (b) feeding each of the partial streams (3, 5) into a separate decomposition reactor, wherein each reactor (Continued)

(31) comprises a catalyst; (c) decomposing the nitrous oxide into nitrogen and oxygen in the decomposition reactors to obtain purified streams (13, 15); (d) optionally feeding each purified stream (13, 15) into a unit (11) for decomposing nitrogen dioxide and/or nitrogen monoxide or combining at least two purified streams (13, 15) and feeding the combined purified streams into a unit (11) for decomposing nitrogen dioxide and/or nitrogen monoxide, wherein the catalysts of the decomposition reactors (31) are changed alternatingly and wherein one of the catalysts is changed when the arithmetic mean of the lifetime of the catalysts in the other reactors has reached 25 to 75% of the lifetime of one catalyst.

12 Claims, 1 Drawing Sheet

(56) References Cited

U.S. PATENT DOCUMENTS

| 2010/0196238 | A1 | 8/2010 | Fujiwara |
| 2012/0014855 | A1 | 1/2012 | Beran et al. |

| 2013/0156672 | A1* | 6/2013 | Angelides | ........... B01D 53/565 |
| | | | | 423/239.2 |
| 2014/0363359 | A1 | 12/2014 | Schwefer et al. | |
| 2017/0246589 | A1* | 8/2017 | Angelides | ........... B01D 53/565 |
| 2020/0368684 | A1 | 11/2020 | Münster-Swendsen et al. | |

FOREIGN PATENT DOCUMENTS

| CN | 111974208 | A | 11/2020 | |
| EP | 1040862 | A1 | 10/2000 | |
| EP | 1413349 | A1 | 4/2004 | |
| EP | 1488845 | A1 * | 12/2004 | ......... B01D 53/8631 |
| EP | 2387450 | B1 | 3/2014 | |
| EP | 2548629 | B1 | 4/2015 | |
| EP | 2387451 | B1 | 3/2016 | |
| JP | 05-004027 | A | 1/1993 | |
| JP | 2013-167420 | A | 8/2013 | |
| WO | 2011/146469 | A2 | 11/2011 | |
| WO | 2011/151006 | A1 | 12/2011 | |

* cited by examiner

PROCESS FOR DECOMPOSING NITROUS OXIDE FROM A GAS STREAM

CROSS-REFERENCE TO RELATED APPLICATIONS

This application is a National stage application (under 35 U.S.C. § 371) of PCT/EP2022/050152, filed Jan. 5, 2022, which claims benefit of European Application No. 21151405.4, filed Jan. 13, 2021, both of which are incorporated herein by reference in their entirety.

The invention proceeds from a process for decomposing nitrous oxide from a gas stream in which a gas stream is preheated and fed into a decomposition reactor in which the nitrous oxide is decomposed into nitrogen and oxygen.

Usually, the decomposition of nitrous oxide into nitrogen and oxygen is carried out in the presence of a catalyst, particularly a fixed bed catalyst.

Nitrous oxide for example accrues in a process for producing adipic acid. For producing adipic acid usually nitric acid is added to a mixture of cyclohexanone and cyclohexanol. By reaction of the cyclohexanone and cyclohexanol with the nitric acid a reaction mixture containing adipic acid, nitrous oxide, nitrogen monoxide and nitrogen dioxide is formed. The adipic acid is removed from the reaction mixture by crystallization. Nitrous oxide, nitrogen monoxide and nitrogen dioxide are removed as off-gas by stripping the reaction mixture with air. Thereby, at least a part of the nitrogen monoxide reacts with oxygen forming nitrogen dioxide. The off-gas containing air which is enriched in nitrous oxide and nitrogen dioxide is fed to a washing unit in which nitrogen dioxide is removed from the off-gas by absorption with water. The nitrogen dioxide is used for producing nitric acid which then can be used in the production of the adipic acid. In the washing unit the off gas is optionally mixed with combustion gas from ammonia combustion with air, is compressed, passes a residence time reactor, is cooled in at least one heat exchanger and is absorbed in an absorber, preferably in an absorption column.

As the crystallization process tends to create plugging during longer shutdowns, particularly shutdowns longer than 12 h, long run times are favorable for the operation of an adipic acid plant.

As the nitrous oxide is a greenhouse gas, for reducing the amount of nitrous oxide in the off-gas, processes were installed in which the nitrous oxide is decomposed into oxygen and nitrogen. Equipment for decomposing the nitrous oxide usually comprises a reactor, a regenerative heater and an additional heater which is used for controlling the inlet temperature of the off-gas into the reactor. Further, for diluting the off-gas which is fed into the reactor, a recycle line with a compressor is provided through which a part of the gas withdrawn from the reactor can be recycled into the off-gas which is fed into the reactor.

The catalytic decomposition of the nitrous oxide usually is operated at a temperature in the range from 430° C. to 800° C. Depending on the state of the catalyst and the temperature win-dow, the concentration of nitrous oxide of the inlet stream into the decomposition unit which may be in the range from 6 to 20 vol-% may be reduced to a concentration in the outlet stream withdrawn from the decomposition unit in a range from 50 to 3000 vol-ppm.

The temperature of the inlet stream for achieving the required decomposition rate depends inter alia on the inlet concentration and the catalyst age. The inlet temperature thereby usually is in the range from 430° ° C. to 650° ° C. with increasing inlet temperature on increasing catalyst age.

If the desired concentration in the outlet stream cannot be achieved at a temperature of the inlet stream of 650° C., the catalyst must be changed.

The challenge for decomposition of nitrous oxide from the off-gas from the production of adipic acid is the highly exothermic behavior of this reaction. Each percent of nitrous oxide in the off-gas stream creates an adiabatic temperature increase of 25° C. To prevent catalyst sintering, the temperature in the decomposition unit should remain below 800° C. On the other hand, for achieving the most effective decomposition of the nitrous oxide, the temperature should be as high as possible. A common limit is the design temperature of the inlet section in case of using standard chromium-nickel based steals, which usually is in a range from 550° C. to 650° C.

Avoiding too high temperatures usually is achieved by dilution of the off-gas stream with purified gas, particularly with a recycle flow from the outlet stream. The optimum inlet temperature can be achieved by an optimum degree of heat recovery from the purified gas and/or additional preheating.

Processes and apparatus for removing nitrous oxide from a gas stream by catalytic decomposition are described for example in EP-B 2 387 451, EP-B 1 413 349, EP-B 2 387 450, EP-B 2 165 756 or EP-B 2 548 629.

Further, to avoid long shutdowns, the equipment may comprise two reactors to continue the process when maintenance work is carried out, for example changing the used catalyst.

However, it is a disadvantage of the known process that due to catalyst aging the efficiency of the process for decomposing the nitrous oxide reduces.

Thus, it is an object of the present invention to provide a process for decomposing nitrous oxide from a gas stream which is independent from catalyst aging and which allows a high degree of decomposition of nitrous oxide and a high temporal availability.

This object is achieved by a process for decomposing nitrous oxide from a gas stream, comprising:

(a) splitting the gas stream into at least two partial streams and heating the partial streams;

(b) feeding each of the partial streams into a separate decomposition reactor, wherein each reactor comprises a catalyst;

(c) decomposing the nitrous oxide into nitrogen and oxygen in the decomposition reactors to obtain purified streams;

(d) optionally feeding each purified stream into a unit for decomposing nitrogen dioxide and/or nitrogen monoxide or combining at least two purified streams and feeding the combined purified streams into a unit for decomposing nitrogen dioxide and/or nitrogen monoxide, wherein the catalysts of the decomposition reactors are changed alternatingly and wherein one of the catalysts is changed when the arithmetic mean of the lifetime of the catalysts in the other reactors has reached 25 to 75% of the lifetime of one catalyst.

Surprisingly it has been shown that by splitting the gas stream into partial streams and feeding the partial streams each into a separate decomposition reactor, particularly splitting the gas stream into a first partial stream and a second partial stream and feeding the first partial stream into a first decomposition reactor and the second partial stream into a second decomposition reactor, the total efficiency of the decomposition process could be improved and the total amount of remaining nitrous oxide in the off-gas after recombining the partial streams after they passed the respective decomposition reactors is much lower than when the whole gas stream passed only one decomposition reactor.

The decomposition reaction of nitrous oxide into oxygen and nitrogen is carried out at elevated temperature and usually in the presence of a catalyst. For carrying out the decomposition reaction at elevated temperatures, it is necessary to heat the gas stream or, if the gas stream first is split into partial streams, the partial streams.

According to the invention, the gas stream is split firstly into the partial streams and then each partial stream is heated separately. This allows a higher flexibility of the process and particularly to feed the partial streams into the respective decomposition reactors with a temperature at which the decomposition reaction is optimized.

Heating of the gas streams can be carried out by any heating process known to a skilled person. For enhancing the efficiency of the heating process and to reduce energy consumption for heating the gas stream, it is particularly preferred to preheat the gas stream by indirect heat transfer from the purified streams withdrawn from the decomposition reactor.

For heating the partial streams, it is preferred to use the purified partial stream withdrawn from the respective decomposition reactor for preheating the respective partial stream.

Alternatively it is also possible that before splitting the gas stream into partial streams and heating the partial streams, the whole gas stream is preheated. In this case it is also particularly preferred to preheat the whole gas stream by indirect heat transfer from the combined purified streams withdrawn from the decomposition reactors.

For optimizing the decomposition in each decomposition reactor depending on the catalyst age, it is preferred that the temperature of each partial stream fed into the decomposition reactors can be set individually. This allows for feeding the partial stream into a decomposition reactor containing an older catalyst at a higher temperature and into a decomposition reactor containing a fresher catalyst at a lower temperature so that the decomposition of nitrous oxide in each decomposition reactor is optimized. For setting the temperature individually, it is either possible to preheat the whole gas stream before splitting into the partial streams and then heat the partial streams or to firstly split the gas stream into the partial streams and then heat the partial streams separately. Particularly preferably, firstly the gas stream is split into the partial streams and then the partial streams are heated separately.

The heat exchanger used for heating the gas stream or the partial streams by heat transfer from the combined purified streams withdrawn from the decomposition reactors or from the respective purified stream withdrawn from the respective decomposition reactor (in the following also termed as "regenerative heat exchanger") can be any heat exchanger known to a skilled person. Suitable heat exchangers for example are shell and tube heat exchangers, tube bundle heat exchangers with u-tubes, spiral tube heat exchangers or coils. If a shell and tube heat exchanger or a spiral tube heat exchanger is used, the gas stream to be heated and the gas stream withdrawn from the decomposition reactor can flow in counter-current or in co-current, wherein counter-current is preferred. If a tube bundle heat exchanger with u-tubes is used, the gas stream to be heated and the gas stream withdrawn from the decomposition reactor flows in cross-flow. The usage of a shell and tube heat exchanger is preferred.

If the heat transfer in the regenerative heat exchanger is not sufficient to heat the off-gas stream to a predefined temperature with which the off-gas stream is fed into the fixed bed reactor, it is preferred to provide an additional heater. Alternatively, it is also possible to only use a heater and to omit the regenerative heat exchanger. However, for reasons of energy saving, it is preferred to heat the off-gas stream in a regenerative heat exchanger and provide the additional heater to have the opportunity for further heating the off-gas stream to the predefined temperature if heating in the regenerative heat exchanger is not sufficient. The additional heater, if a regenerative heat exchanger is comprised, or the heater, if no regenerative heat exchanger is used, preferably is an electrical heater. However, besides an electrical heater, also a direct or indirect gas fired heater can be used as additional heater or heater. Direct gas fired heater means that the off gas of the gas fired heater is added to the nitrous oxide comprising off-gas stream. Indirect gas fired heater means that the heating the off-gas of the gas fired heater is transferred to the nitrous oxide comprising off-gas stream by an additional heat exchanger. Among the gas fired heaters a direct gas fired heater is preferred.

The temperature to which the gas stream is heated or the partial streams are heated particularly depends on the concentration of nitrous oxide in the gas stream and the catalyst age. Usually, the gas stream is or the partial streams are heated to a temperature in the range from 430 to 650° C., more preferred to a temperature in the range from 450 to 550° C. and particularly to a temperature in the range from 480 to 520° C.

For setting the temperature, preferably the concentration of nitrous oxide in the purified stream withdrawn from the decomposition reactor is determined. If the concentration exceeds a given target, the temperature is increased until either the targeted concentration is reached or an upper limit for the temperature is reached. The upper limit for the temperature is a temperature with a given offset below the temperatures defined by safety interlocks of the decomposition reactor If the concentration of nitrous oxide in the purified stream withdrawn from the decomposition reactor exceeds the targeted concentration and the maximum temperature for feeding the gas stream into the decomposition reactor is reached, the catalyst must be changed.

The thus heated off-gas stream is then fed into the fixed bed reactor for decomposing the nitrous oxide into nitrogen and oxygen. The fixed bed contains a suitable catalyst for the decomposition of the nitrous oxide. Thereby, any catalyst suitable for the decomposition reaction can be used. Suitable catalysts particularly are catalysts based on copper oxide and zinc oxide as catalytic material. Particularly preferably, the catalyst comprises a mixture of 14 to 18 wt-% copper oxide and less than 20 wt % zinc oxide as catalytic active material on aluminum oxide and/or magnesium oxide as support material. Preferably, the catalyst is provided as extrudates with a length of 2 mm to 2 cm, preferably of 4 mm to 1 cm and with a diameter of 2 mm to 10 mm, preferably of 4 to 8 mm. The cross sectional shape of the catalyst is a circular disc or star, preferably a star.

The reaction in the fixed bed reactor is carried out at a temperature in a range from 430 to 800° C., more preferred in a range from 450 to 750° C. and particularly in a range from 520 to 700° C.

Due to aging of the catalyst and the partial deactivation of the catalyst as a result of the aging, it is necessary to increase the temperature for carrying out the decomposition reaction with increasing age of the catalyst. However, to avoid sintering of the catalyst, the temperature in the fixed bed reactor should not exceed 800° C.

The catalyst can be contained in each decomposition reactor in any suitable form, for example as a fluidized bed or a fixed bed. Preferably, the catalyst is a fixed bed catalyst. If the catalyst is a fixed bed catalyst, the catalyst can be a structured packing, monolith or an unstructured packing of catalyst particles. Preferably, the fixed bed is an unstructured packing of catalyst particles. As the catalyst ages during its lifetime, it is necessary to change the catalyst after reaching its maximum lifetime. To continuously operate the process for decomposing nitrous oxide, the catalysts of the decomposition reactors are changed alternating. By changing the catalysts alternating, it is possible to operate all decomposition reactors in which the catalyst is not 40 changed while only a part of the decomposition reactors, preferably only one decomposition reactor, is shut down for changing the catalyst. As long as one reactor is shut down, all partial streams are fed into the other decomposition reactors which are not shut down. For this purpose, if only two decomposition reactors are used, the whole gas stream is fed into that decomposition reactor which is not shut down. If more than two decomposition reactors are used, the gas stream is split into partial streams, the number of partial streams corresponding to the number of all decomposition reactors minus the number of the decomposition reactors being shut down and each partial stream is fed into one of the decomposition reactors which are not shut down.

Changing of the catalysts preferably is carried out at regular intervals, wherein one of the catalysts is changed when the arithmetic mean of the lifetime of the catalysts in the other reactors has reached 25 to 75%, preferably one third to two thirds of the lifetime of one catalyst. Thereby the intervals preferably are set such that the runtime of all reactors until one of the reactors is shut down for changing the catalyst always is substantially the same. This means, for example, if two decomposition reactors are used, that the catalyst of one decomposition reactor is changed when the catalyst of the other decomposition reactor has reached 25 to 75%, preferably one third to two thirds, of its lifetime and particularly the half of its lifetime. If three decomposition reactors are used, the catalyst of one decomposition reactor is changed when the catalysts of the other reactors have reached 25 to 75% of their lifetime and particularly when the catalysts of the other reactors have reached one third to two thirds of their lifetime. Particularly preferably the catalyst of one decomposition reactor is changed when the catalyst of the second decomposition reactor has reached about one third of its lifetime and the catalyst of the third decomposition reactor has reached about two thirds of its lifetime.

By such a changing interval, it is avoided that at least two catalysts may come close to the end of their lifetime and, independently of the decomposition reactor in which the catalyst is changed, there is no risk that the efficiency of the catalyst of the other decomposition reactors which are in operation are close to the end of their lifetime. As the catalyst in the decomposition reactors which are in operation have reached only a part of their lifetime, the catalysts have a defined efficiency which always is substantially the same when one of the decomposition reactors is shut down for changing the catalyst.

Due to catalyst aging, the efficiency of the catalyst reduces with continuing lifetime of the catalyst. This results in a reduced decomposition of nitrous oxide. To reduce the amount of nitrous oxide in the gas stream as much as possible, it is preferred to reduce the amount of the partial stream which is fed into a decomposition reactor containing an older catalyst and to increase the partial stream which is fed into a decomposition reactor containing a fresher catalyst. By reducing the partial stream which is fed into the decomposition reactor containing the older catalyst, the efficiency of the overall process can be optimized.

Increasing the temperature of the partial stream which is fed into a decomposition reactor containing an older catalyst for optimizing the efficiency of the catalyst as described above can be carried out alternatively or additionally to reducing the amount of the gas stream fed into the decomposition reactor which contains the older catalyst. Particularly preferably, the temperature of the partial stream which is fed into a decomposition reactor containing an older catalyst is increased while at the same time the partial stream is reduced.

The gas stream may originate from any process where nitrous oxide is formed or used. Such a process for example is the production of adipic acid. For producing adipic acid, nitric acid is added to a mixture of cyclohexanone and cyclohexanol. By reaction of the cyclohexanone and cyclohexanol with the nitric acid a reaction mixture containing adipic acid, nitrous oxide, nitrogen monoxide and nitrogen dioxide is formed. The nitrous oxide, nitrogen monoxide and nitrogen dioxide for example are removed from the reaction product by stripping with air. By stripping, a crude product comprising the adipic acid is obtained and an off-gas containing the air enriched in nitrous oxide, nitrogen monoxide and nitrogen dioxide. Usually, at least a part of the nitrogen monoxide reacts with oxygen and forms nitrogen dioxide. The nitrogen dioxide preferably is removed by washing and reused for producing nitric acid.

If the gas stream is off-gas which originates from a process for producing adipic acid, it is particularly preferred to work up the off-gas stream for removing nitrogen oxides before feeding the gas into the process for decomposing nitrous oxide.

Preferably, the nitrogen oxides are absorbed from the off-gas stream in water by pressure absorption. For absorbing the nitrogen oxides in water, preferably an absorption column is used. The absorption column may be operated in counter current or co-current, preferably in counter current. For this purpose, the off-gas stream is fed into the absorption column at one end, preferably at the bottom and the water is fed at the other end, preferably the top of the absorption column. Inside the absorption column nitrogen dioxide is absorbed in water by formation of nitric acid and nitrogen monoxide. The nitrogen monoxide reacts with the oxygen in the off-gas stream by formation of nitrogen dioxide, which again is absorbed in water by the formation of nitric acid and nitrogen monoxide. This process repeats along the whole column so that at the exit of the column the amounts of nitrogen dioxide as well as nitrogen monoxide are reduced in the off-gas stream. After absorbing the nitrogen oxides by this mechanism, the nitric acid comprising water is removed from the absorption column at the bottom. The absorption column preferably comprises 10 to 80 stages, more preferred 20 to 70 stages and particularly 40 to 60 stages. The temperature at which the absorption is carried out preferably is in a range from 5 to 70° C., more preferred in a range from 10 to 60° C. and particularly in a range from 20 to 50° C.

The absorption column preferably comprises internals. Suitable internals for example are pack-ings like a packed bed or a structured packing. Further, the absorption column may comprise trays as internals. Particularly preferably, the internals in the absorption column are water-cooled trays.

The off gas stream preferably is fed to the absorption column together with an additional gas mixture from ammonia combustion, comprising mainly nitrogen monoxide and nitrogen dioxide, water, oxygen, nitrogen, argon and carbon dioxide.

Additionally or alternatively, besides feeding the nitrous oxide comprising off gas stream optionally together with an additional gas mixture from ammonia combustion to the absorption column, it is preferred that nitrogen monoxide contained in the off-gas stream is oxidized to nitrogen dioxide before feeding the off-gas stream into the absorption column. For oxidizing the nitrogen monoxide, it is preferred to compress the off-gas stream to a pressure in a range from 1.2 to 3 bar(abs), more preferred in a range from 1.3 to 2.7 bar(abs) and particularly in a range from 1.5 to 2.5 bar(abs). In a following step or simultaneously, the off-gas stream is cooled to a temperature in a range from 20 to 50° C., more preferred in a range from 25 to 45° C. and particularly in a range from 30 to 40° C. After cooling, the off-gas stream is compressed in a second step to a pressure in a range from 3 to 12 bar(abs), more preferred in a range from 4 to 11 bar(abs) and particularly in a range from 5 to 10 bar(abs).

The thus compressed off-gas stream and additional air are passed through a residence-time reactor, wherein the ratio of the normalized volume flows of the compressed off-gas stream and additional air preferably is in a range from 1.5 to 3.5, more preferred in a range from 1.6 to 2.9 and particularly in a range from 1.8 to 2.5. The inlet temperature of the off-gas stream into the residence-time reactor preferably is in a range from 120 to 300° C., more preferred in a range from 150 to 275° C. and particularly in a range from 220 to 250° C., the outlet temperature of the off-gas stream leaving the residence-time reactor preferably is in a range from 250 to 360° ° C., more preferred in a range from 270 to 350° C. and particularly in a range from 280 to 340° C. The residence time of the off-gas stream in the residence-time reactor preferably is in a range from 10 to 60 sec, more preferred in a range from 15 to 50 sec and particularly in a range from 20 to 30 sec.

After passing the residence-time reactor, the off-gas stream is cooled to a temperature in the range from 10 to 50° C., more preferred in a range from 20 to 40° C. and particularly in a range from 30 to 35° C.

After carrying out the pressure absorption for removing nitrous oxide and/or the oxidization reaction of nitrogen monoxide, the off-gas stream is fed partially or completely into an $N_2O$ isolation in which nitrous oxide from at least a part of the off-gas stream is concentrated by a two-stage absorption/desorption process with water.

In the first stage of the two-stage absorption/desorption process, $N_2O$ is absorbed in water in a first absorption column. The first absorption column is operated at a pressure in a range from 15 to 30 bar(abs), more preferred in a range from 17 to 28 bar(abs) and particularly in a range from 19 to 26 bar(abs) and a temperature in a range from 10 to 45° C., more preferred in a range from 20 to 42° C. and particularly in a range from 30 to 35° C. Following the first absorption stage, the nitrous oxide is desorbed from the water in a first desorber which runs at a pressure in a range from 1 to 1.5 bar(abs), more preferred in a range from 1.05 to 1.3 bar(abs) and particularly in a range from 1.1 to 1.2 bar(abs) and a temperature in a range from 10 to 45° C., more preferred in a range from 20 to 42° C. and particularly from 30 to 35° C. After being desorbed from the water, the resulting gas stream is fed into a second absorption column which runs at a pressure in a range from 15 to 30 bar(abs), more preferred in a range from 17 to 25 bar(abs) and particularly in a range from 19 to 23 bar(abs) and a temperature in a range from 10 to 45° C., more preferred in a range from 15 to 30° C. and particularly in a range from 20 to 35° C. In a second desorber which is operated at a pressure in a range from 1 to 1.5 bar(abs), more preferred in a range from 1.05 to 1.3 bar(abs) and particularly in a range from 1.1 to 1.2 bar(abs) concentrated nitrous oxide is obtained which preferably is fed into a process for producing cyclododecanone and cyclopentanone.

Only a part of the nitrous oxide in the off-gas stream from the pressure absorption and/or oxidation of nitrogen monoxide is absorbed in the two-stage absorption/desorption process. The remaining part preferably is split for being recycled into the off-gas stream comprising the mixture of the off-gas from adipic acid production and optionally off-gas from ammonia combustion, before carrying out the oxidation reaction of nitrogen monoxide and for being fed to the decomposition process of nitrous oxide.

Even though in the two stage absorption/desorption process a large part of the nitrogen oxide is removed from the off-gas stream, the off-gas stream withdrawn from the two stage absorption/desorption process still contains 5 to 18 vol % nitrous oxide. As nitrous oxide has green-house-gas factor of about 300, it is necessary to remove the nitrous oxide from the off-gas stream.

For removing the nitrous oxide from the off-gas stream, the off-gas stream is heated to a temperature in a range from 100 to 300° C., more preferred in a range from 170 to 270° C. and particularly in a range from 210 to 260° C. and then fed into the inventive process for decomposition of nitrous oxide. The pressure with which the off-gas stream is fed into the process for decomposition of nitrous oxide preferably is in a range from 5 to 10 bar(abs), more preferred in a range from 6 to 9.5 bar(abs) and particularly in a range from 7 to 9 bar(abs).

Preferably, the off-gas stream is heated in a tube bundle heat exchanger, a u-tube bundle heat exchanger or a spiral heat exchanger. Preferably, a tube bundle heat exchanger is used for heating. As heating medium, preferably, the hot off-gas withdrawn from the residence time reactor is used. The thus heated gas stream then is fed into step (a) of the inventive process in which the stream is split into partial streams and heated to the temperature with which the partial streams are fed into the decomposition reactor. Particularly preferably, firstly the whole gas stream before splitting into the partial streams is heated to the temperature in the range between 100 to 300° C., more preferred in a range from 170 to 270° C. and particularly in a range from 210 to 260° C. and then the partial streams after splitting are heated separately to the temperature with which the partial streams are fed into the decomposition reactor.

For washing the off-gas of the adipic acid production, usually two pressure absorption units are provided. Of these two pressure absorption units only one absorption unit is operated with adipic acid off-gas. According to the present invention, if only one pressure absorption unit is operated, the gas stream leaving this pressure absorption unit is the gas stream which is processed by the inventive process and which is heated in split in step (a) of the inventive process.

The remaining off-gas containing nitrous oxide and optionally remainders of nitrogen monoxide and nitrogen dioxide is the gas stream which is fed into the inventive process. Preferably, the gas stream which is fed into the process contains 3 to 25 vol-% nitrous oxide, more preferred 4 to 18 vol-% nitrous oxide and particularly 6 to 13 vol-% nitrous oxide. Further, the off-gas stream fed into the $N_2O$ decomposition unit may comprise 1 to 12 vol-% oxygen, 0.5 to 5 vol-% carbon dioxide, 0 to 0.3 vol-% carbon monoxide, 0.2 to 0.8 vol-% noble gases, particularly argon, 0.1 to 2 vol-% water, and 200 to 5000 vol-ppm nitrogen oxides, more preferred 1.5 to 6 vol-% oxygen, 0.7 to 3.5 vol-% carbon dioxide, 0 to 0.25 vol-% carbon monoxide, 0.3 to 0.6 vol-% noble gases, particularly argon, more preferred 0.2 to 1.3 vol-% water and 300 to 3000 vol-ppm nitrogen oxides and particularly 2 to 4 vol-% oxygen, 1 to 2 vol-% carbon dioxide, 0 to 0.2 vol-% carbon monoxide, 0.2 to 0.5 vol-% noble gases, particularly argon, 0.3 to 1 vol-% water, and 500 to 1000 vol-ppm nitrogen oxides.

The main component in the off-gas stream is nitrogen which is comprised in an amount from 55 to 95 vol-%, more preferred from 70 to 92 vol-% and particularly from 80 to 90 vol-%. Besides these components, the off-gas stream may contain further impurities which usually are in amount below 2 vol-%, more preferred below 1 vol-% and particularly below 0.5 vol-%.

For achieving a sufficient low concentration of nitrous oxide in the purified gas withdrawn from the decomposition reactors, the concentration of nitrous oxide in the gas stream which is fed into the decomposition reactors should be below 13 vol-%, more preferred below 12 vol.-% and particularly below 11 vol-%. If the concentration of nitrous oxide in the gas stream is above these values, preferably a part of the purified gas withdrawn from the decomposition reactor is recycled into the decomposition reactor as recycle stream. The amount of the recycle stream is set such that the amount of $N_2O$ in the gas stream being fed into the decomposition reactor re-mains below these concentration values.

The recycle stream is established by a recycle blower. The amount of recycled purified gas depends on the rotational speed of the recycle blower and/or on the internal recirculation rate of the recycle blower. By changing the degree of internal recirculation between the pressure and inlet side of the recycle blower the effective recycle stream can be changed without changing the rotational speed of the recycle blower.

Preferably, the recycle stream of each decomposition reactor is set independently. By setting the recycle stream of each decomposition reactor independently, it is possible to operate each decomposition reactor under optimal conditions.

The inventive process for decomposing nitrous oxide particularly is suitable for industrial scale processes. Therefore, the volume flow fed into an $N_2O$ decomposition unit comprising the at least two decomposition reactors may be in a range from 5000 to 70000 $Nm^3/h$, more preferred in a range from 7000 to 60000 $Nm^3/h$ and particularly in a range from 10000 to 50000 $Nm^3/h$. However, besides working up nitrous oxide comprising off-gas in an industrial scale, it is also possible to use the process in a process where smaller amounts of nitrous oxide off-gas occur, for example in a pilot plant or in a laboratory. However, particularly preferably, the process is used in industrial scale.

The catalyst loading of the nitrous oxide comprising volume flow in normalized cubic meters per hour and per kg catalyst on the fixed bed preferably is in the range from 0.5 to 10 $Nm^3/h/kg$ catalyst, more preferred in a range from 1.5 to 6.5 $Nm^3/h/kg$ catalyst and particularly in a range from 2 to 4 $Nm^3/h/kg$ catalyst.

The decomposition of nitrous oxide into nitrogen and oxygen can be performed in an ideal isothermal or an ideal adiabatic mode, or in modes in between ideal isothermal or ideal adiabatic. The decomposition of nitrous oxide into nitrogen and oxygen is a strong exothermal reaction. Every percent of nitrous oxide in the off gas fed to a reactor in an ideal adiabatic mode results in a temperature increase of the off gas of 25 Kelvin. The reactor mode between ideal isothermal and ideal adiabatic is defined by an adiabatic degree, which is 100% minus the ratio of the heat flux passing from the catalyst bed into its environment such as confining walls, catalyst support materials by conduction and radiation divided by the reaction heat flux. The decomposition reaction is done with an adiabatic of larger than 55%, preferably larger than 75% and more preferably larger than 85%.

For initiating the reaction in the catalyst bed a certain inlet temperature of the off gas flow entering the catalyst bed and/or of the catalyst bed is necessary. In the case of high concentrations of nitrous oxide, nearly complete decomposition of the nitrous oxide and reaction modes with a high adiabatic degree in the reaction bed this may result in gas exit temperatures, which are higher than maximum allowable temperatures by safety reasons. Usually the exceeding of such upper temperature limits is prevented by safety interlocks, which have a given set point for the maximum temperature. For accounting temperature fluctuations and uncertainties of temperature measurements the maximum operation temperature is selected with a given offset below the set point of the safety interlock. The selected offset preferably is between 100 and 3 K, preferably between 50 and 3 K, more preferably between 30 and 3 K and particularly between 20 and 3 K.

For preventing to high temperatures in the catalyst bed or in the gas phase, it is preferred to add gas which does not contain nitrous oxide or which contains a lower amount of nitrous oxide to achieve the preferred content of nitrous oxide. By a content of nitrous oxide in the above range, the decomposition reaction is optimized and thus the amount of remaining nitrous oxide in the purified stream removed from the decomposition reactors can be minimized. For reducing the content of nitrous oxide in the partial stream it is particularly preferred to recycle a part of the purified stream withdrawn from the decomposition reactor into the partial stream which is fed into the decomposition reactor before heating.

If a regenerative heat exchanger is used, the purified gas stream leaving the decomposition reactors is fed into the regenerative heat exchanger for heating the gas stream which then is fed into the decomposition reactors. If only one regenerative heat exchanger is used and the gas stream is split after passing the regenerative heat exchanger, the purified gas streams are combined before being fed into the regenerative heat exchanger. On the other hand, if the gas stream is split before being heated in the regenerative heat exchanger, each partial stream leaving a decomposition reactor is fed into the respective regenerative heat exchanger in which this gas stream was heated before being fed into the decomposition reactor. In each regenerative heat exchanger, the purified gas stream is cooled by heat transfer to the gas stream fed into the process.

Independently whether a regenerative heat exchanger is comprised, it is preferred to further cool the purified gas withdrawn from the fixed bed reactor. Cooling preferably is carried out by heat transfer in at least one heat exchanger in which heat is transferred to a cooling medium, particularly water. Particularly preferably, in at least one heat exchanger the water is evaporated and/or superheated by the indirect heat transfer from the purified gas withdrawn from the fixed bed reactor. Suitable heat exchangers for cooling the purified gas for example are tube bundle heat exchangers, u-tube bundle heat exchangers, or spiral heat exchangers or coils in the path-way of the off-gas.

Since the gas stream may contain nitrogen monoxide and/or nitrogen dioxide which is not decomposed in the decomposition reactor, it is preferred to feed the purified streams into a unit for decomposing nitrogen dioxide and/or nitrogen monoxide. Thereby, it is either possible to provide a unit for decomposing nitrogen dioxide and/or nitrogen monoxide for each purified stream or alternatively and preferably to combine the purified streams and to feed the combined purified streams into one unit for decomposing nitrogen dioxide and/or nitrogen monoxide. Further, if more than one unit for decomposing nitrogen dioxide and/or nitrogen monoxide are comprised, it is possible to feed the combined purified gas streams into only one unit for decomposing nitrogen dioxide and/or nitrogen monoxide. In this case, the second unit for decomposing nitrogen dioxide and/or nitrogen monoxide, for example is a backup unit which may be used if the other unit decomposing nitrogen dioxide and/or nitrogen monoxide is subject to maintenance operations.

The unit for decomposing nitrogen dioxide and/or nitrogen monoxide can be any unit for decomposing nitrogen dioxide and/or nitrogen monoxide known to a skilled person. Usually, in such a unit for decomposing nitrogen dioxide and/or nitrogen monoxide the nitrogen dioxide and/or nitrogen monoxide are decomposed by selective non-catalytic reduction or selective catalytic reduction. In the reaction, ammonia or urea is used as reducing agent.

Due to the high pressure of the gas stream which is passed through the decomposition reactors and optionally through the unit for decomposing nitrogen dioxide and/or nitrogen monoxide, it is preferred to pass the gas stream through an expansion turbine before releasing the gas into the atmosphere. By passing the gas stream through an expansion turbine, the pressure can be used for producing electric current or for example for driving a compressor or any other apparatus having rotating parts which shall be driven.

An illustrative embodiment of the invention is shown in the figures and explained in more detail in the following description.

Figure 1:
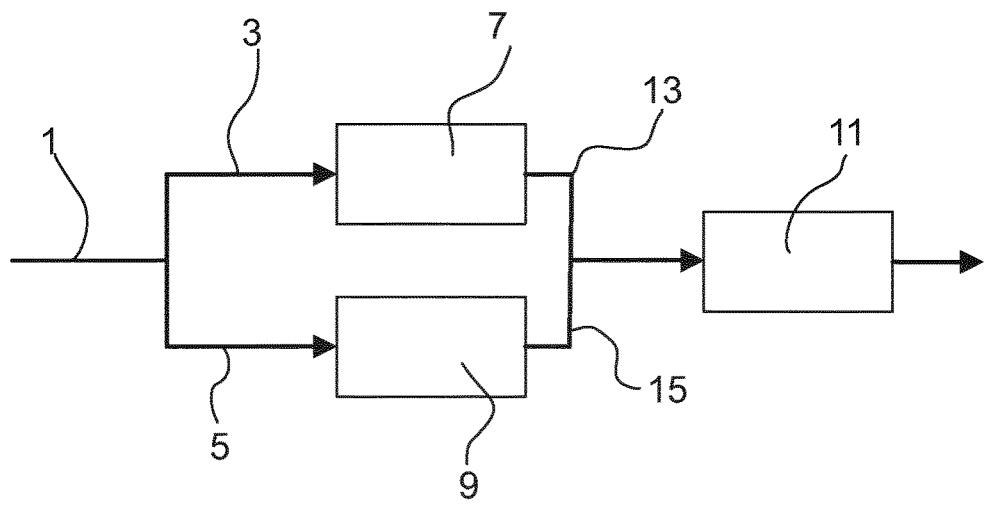
FIG. 1 shows a schematic flow diagram of the process for decomposing nitrous oxide.

In a process for decomposing nitrous oxide according to the invention, a gas stream 1, which contains nitrous oxide and optionally nitrogen monoxide and nitrogen dioxide, is split into a first partial stream 3 and a second partial stream 5. The first partial stream 3 is fed into a first decomposition unit 7 and the second partial stream 5 into a second decomposition unit 9.

In the first and second decomposition units 7, 9, the nitrous oxide in the first and second partial streams 3, 5 is decomposed into nitrogen and oxygen and a first purified stream 13 and a second purified stream 15 are obtained. In the embodiment shown in FIG. 1, after passing the first and second decomposition units 7, 9, the obtained first and second purified streams 13, 15 are recombined and fed into a unit 11 for decomposing nitrogen monoxide and/or nitrogen dioxide. The unit 11 for decomposing nitrogen monoxide and/or nitrogen dioxide thereby can be any decomposition unit for nitric oxides known to a skilled person.

Besides splitting the gas stream 1 into two partial streams as shown in FIG. 1, the gas stream also can be split in more than two partial streams. In this case, each partial stream is fed into a separate decomposition unit. Further, besides recombining the purified streams before feeding into the unit 11 for decomposing nitrogen monoxide and/or nitrogen dioxide, it is also possible to feed each purified stream into a separate unit for decomposing nitrogen monoxide and/or nitrogen dioxide. After having passed the at least one unit 11 for decomposing nitrogen monoxide and/or nitrogen dioxide, the purified gas can be emitted into the atmosphere. If more than one unit for decomposition of nitrogen monoxide and/or nitrogen dioxide is used, each purified stream can be emitted into the atmosphere or at least two purified streams are combined and then emitted into the atmosphere.

Further, if the gas stream 1 is split into more than two partial streams, it is possible to recombine groups of at least two of the purified streams and feed each of combined streams into a separate unit for decomposition of nitrogen monoxide and/or nitrogen dioxide.

Using the first and the second decomposition units 7, 9 or optionally more than two decomposition units allows for splitting the gas stream 1 in such a way that each decomposition unit is fed with an amount of gas by which the nitrous oxide which did not decompose is minimized. Further, the temperature in each decomposition unit can be optimized in regard to the activity of the catalyst in the respective decomposition unit. Optimizing the temperature, for example, can be realized by setting the degree of the bypass 43 and/or by setting the power of the heater 29 and/or by setting a recycle stream from the outlet of the decomposition unit 7, 9 back into the inlet of the respective decomposition unit 7, 9. Further, using the at least first and second decomposition units 7, 9 allows for continuing operation even in case one decomposition unit is shut down, for example for maintenance like changing the catalyst. In this case, the gas streams 1 is fed into the decomposition unit 7, 9 which is not shut down if two decomposition units are comprised and, if more than two decomposition units are comprised, the gas stream is split into a number of partial streams which corresponds to the number of all decomposition units minus the number of the decomposition units which are shut down and the partial streams are fed into those decomposition units which still are in operation.

Figure 2:
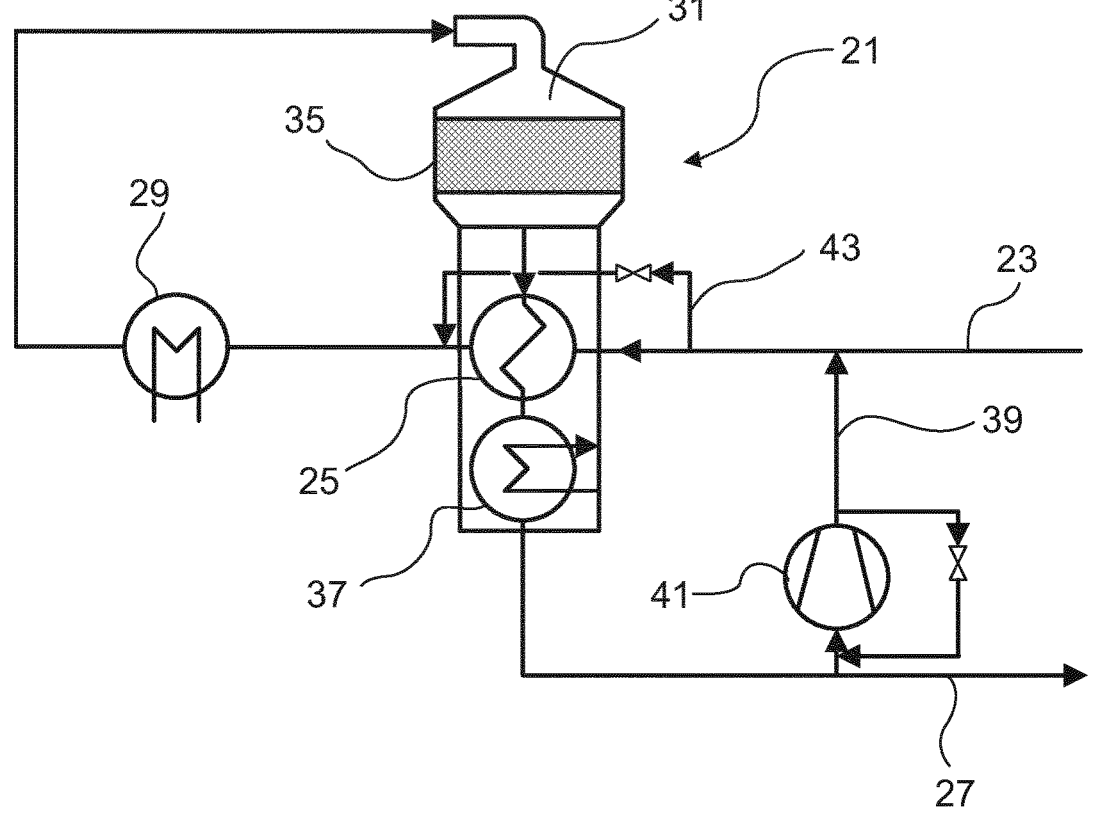
FIG. 2 shows a decomposition unit for decomposing nitrous oxide.

If the device comprises two decomposition units 7, 9, the first decomposition unit 7 and the second decomposition unit 9 preferably have the same design which corresponds to the design of a decomposition unit 21 as shown in FIG. 2. If more than two decomposition units are comprised, all decomposition units preferably have the same design which preferably corresponds to the design of the decomposition unit 21 shown in FIG. 2.

A partial stream 23 which may be the first partial stream 3 or the second partial stream 5 depending on whether the decomposition unit 21 corresponds to the first decomposition unit 7 or the second decomposition unit 9, is fed into a heat exchanger 25 in which the partial stream 23 is preheated by heat transfer from the purified stream 27 which is withdrawn from the decomposition unit 21. If the heat transferred from the purified stream 27 is not sufficient to heat the partial stream 23 to the temperature which is necessary for decomposition of nitrous oxide, the partial stream 23 after having left the heat exchanger 25 is fed into a heater 29 in which the partial stream 23 is heated to the temperature with which the partial stream 23 is fed into a decomposition reactor 31 in which the nitrous oxide is decomposed into nitrogen and oxygen. The heater 29 preferably is an electrical heater.

By further setting the heat which is transferred to the partial stream 23 in the heater 29, the temperature of the partial stream 23 can be set to a predefined temperature with which the partial stream 23 is fed into the decomposition reactor 31. The temperature with which the partial stream 23 is fed into the decomposition reactor 31 preferably is in the range from 430 to 650° C.

The decomposition reaction of the nitrous oxide usually is carried out in the presence of a catalyst. Therefore, the decomposition reactor 31 contains a catalyst, preferably a fixed bed catalyst 35. In the fixed bed catalyst 3, the nitrous oxide is decomposed forming oxygen and nitrogen. The gas stream obtained by the reaction then is fed into the heat exchanger 25 for heating the partial stream 23 which then is fed into the decomposition reactor 31. By this heat transfer, simultaneously the purified stream 27 withdrawn from the decomposition reactor 31 is cooled. The purified stream 27 may be further cooled in an additional heat exchanger 37. The additional heat exchanger 37 preferably is a heat exchanger for producing steam by evaporation of water or for superheating water. The purified stream 27 withdrawn from the additional heat exchanger 37 can be fed into the unit 11 for decomposing nitrogen dioxide and/or nitrogen monoxide or released into the atmosphere.

For a largely complete or particularly a complete decomposition of the nitrous oxide it is necessary to keep the amount of nitrous oxide in the gas stream fed into the decomposition reactor 31 below a predefined upper range, particularly below 11 wt-%. For reducing the amount of nitrous oxide in the gas stream fed into the decomposition reactor 31 if this gas stream contains too much nitrous oxide, a recycle line 39 with a recycle blower 41 is provided, the recycle line 39 connecting a feed line for the partial stream 23 and an exit line for the purified stream 27.

Further, for setting the temperature of the partial stream 23 fed into the decomposition reactor 31 a bypass 43 may be provided, bypassing the regenerative heat exchanger 25. The bypass 43 may be closed so that the whole gas stream flows through the regenerative heat exchanger 25 or the bypass 43 is open and the feed line into the regenerative heat exchanger 25 is closed so that the whole gas stream flows through the bypass 43 or in a third alternative, the gas stream is split and a part flows through the regenerative heat exchanger 25 and a part through the bypass 43.

Providing each of the decomposition units 21 with a heat exchanger 25 and a heater 29 allows for individually setting the temperature of the partial stream 23 which enters the decomposition reactor 31. However, besides such a design as shown in FIG. 2, it is also possible to at least partly heat the whole gas stream 1 before splitting into the partial streams 3, 5, 23. If the gas stream 1 is heated partly before splitting into the partial streams 3, 5, 23, a final heating of the partial streams takes place and this final heating allows for individually setting the temperature of each partial stream. If the gas stream is heated completely before splitting into the partial streams, it is not possible to further set the temperatures of the partial streams and therefore, an individual setting of the temperature for an optimized decomposition of the nitrous oxide in each decomposition unit 21 is not possible. For this reason, it is preferred that each partial stream 23 is heated at least partly in the individual decomposition unit 21.

Further, providing the recycle line 39 allows for setting the concentration of nitrous oxide in each partial stream 23 fed into the respective decomposition reactor 31 by setting the amount of gas being recycled from the purified gas 27 into the partial stream 23. Therefore, it is preferred that each decomposition reactor 23 is equipped with a recycle line 39 as shown here.

EXAMPLES

Example

An off-gas stream of 32000 $Nm^3/h$ comprising 8 vol-% nitrous oxide with a temperature of 40.5° C. and a pressure of 6.8 bar(abs) which is withdrawn from a production process of adipic acid is heated in a first heat exchanger to a temperature of 273° C. Then the off-gas stream is split into two partial streams.

The first partial stream has a volume flow of 15600 $m^3/h$ and enters a regenerative heat exchanger of a first nitrous oxide-decomposition unit. In this regenerative heat exchanger, the first partial stream is heated by electrical heating to a temperature of 490° C. and then the stream fed into a reactor with a fixed bed containing 8 t of a nitrous oxide-decomposition catalyst. As catalyst, the commercially available BASF-catalyst O3-81 was used. The first purified gas stream withdrawn from the fixed bed catalyst having a temperature of 680° C. and a $N_2O$-concentration of 90 vol.-ppm is fed to the regenerative heat exchanger of the first nitrous oxide-decomposition unit. The first purified gas stream leaves the regenerative first heat exchanger of the first nitrous oxide-decomposition unit and passes a first steam generator.

The second partial steam having a volume flow of 16400 $m^3/h$ enters the regenerative heat exchanger of the second nitrous oxide-decomposition unit in which this stream is heated by electrical heating to a temperature of 490° C. and then is fed to a reactor with a fixed bed with 8 t of a nitrous oxide-decomposition catalyst. As catalyst the commercially available BASF-catalyst O3-81 was used. The second purified gas stream withdrawn from the fixed catalyst bed had a temperature of 675° C. and a $N_2O$-concentration of 70 vol-ppm and is fed to the second regenerative heat exchanger of the second nitrous oxide-decomposition unit. The second purified gas stream leaves the regenerative heat exchanger and passes a second steam generator.

The first and the second purified gas streams were mixed. This mixed gas-stream is fed to a Denox-unit and is released after passing an expansion turbine to atmosphere. The concentration of nitrous oxide of the mixed off-gas flow is 80 vol.-ppm.

Comparative Example

An off-gas stream of 30400 $Nm^3/h$ comprising 8 vol-% nitrous oxide with a temperature of 34° C. and a pressure of 7.2 bar(abs) which is withdrawn from a production process of adipic acid is heated in a first step in a heat exchanger to a temperature of 254° C. and in a second step by regenerative heat exchange and by electrical heating to a temperature of 512° C. and then fed into a reactor with a fixed bed with 8 t of a nitrous oxide-decomposition catalyst. As catalyst the commercially available BASF-Catalyst O3-81 was used. The purified gas stream withdrawn from the fixed catalyst bed had a temperature of 710° C. and was fed to the regenerative heat exchanger and afterwards to a steam generator. The off-gas of the steam generator had a concentration of 660 vol.-ppm nitrous oxide and was fed to a Denox-unit and is released after passing an expansion turbine to atmosphere.

The invention claimed is:

1. A process for decomposing nitrous oxide from a gas stream, comprising:

(a) splitting the gas stream into at least two partial streams, and heating the partial streams;

(b) feeding each of the partial streams into a separate decomposition reactor, wherein each reactor comprises a catalyst;

(c) decomposing the nitrous oxide into nitrogen and oxygen in the decomposition reactors to obtain purified streams;

(d) optionally feeding each purified stream into a unit for decomposing nitrogen dioxide and/or nitrogen monoxide or combining at least two purified streams and feeding the combined purified streams into a unit for decomposing nitrogen dioxide and/or nitrogen monoxide, wherein the catalysts of the decomposition reactors are changed alternatingly and wherein one of the catalysts is changed when the arithmetic mean of the lifetime of the catalysts in the other reactors has reached 25 to 75% of the lifetime of one catalyst.

2. The process according to claim 1, wherein the catalyst is a fixed bed catalyst.

3. The process according to claim 1, wherein the gas stream is split into a first and a second partial stream and the first partial stream is fed into a first decomposition reactor and the second partial stream into a second decomposition reactor.

4. The process according to claim 1 wherein the partial stream which is fed into the decomposition reactor containing an older catalyst is reduced and the partial stream which is fed into a decomposition reactor containing a fresher catalyst is increased.

5. The process according to claim 1, wherein during the change of the catalyst of one decomposition reactor, all partial streams are fed into the other decomposition reactor.

6. The process according to claim 1, wherein the temperature of each of the partial streams fed into the separate decomposition reactor can be set individually.

7. The process according to claim 1, wherein before splitting the gas stream into the at least two partial streams and heating the partial streams, the gas stream is preheated.

8. The process according to claim 1, wherein the partial streams are preheated by heat transfer from the respective purified streams being withdrawn from the decomposition reactors.

9. The process according to claim 1, wherein the partial streams are additionally heated in a heater.

10. The process according to claim 1, wherein a part of the purified stream withdrawn from each of the separate decomposition reactor is recycled into the partial stream fed into the each of the separate decomposition reactor before heating.

11. The process according to claim 10, wherein the part of the purified stream which is recycled into the partial stream can be set individually for each decomposition reactor.

12. The process according to claim 1, wherein the nitrous oxide comprising gas stream is obtained in a process for producing adipic acid.

*   *   *   *   *